United States Patent
Long

(10) Patent No.: US 8,973,232 B2
(45) Date of Patent: Mar. 10, 2015

(54) AUTOMATIC PROCESSING MACHINE FOR HEADER

(75) Inventor: Xiaobin Long, Zhongshan (CN)

(73) Assignee: Zhongshan Oms Industrial Co., Ltd., Zhongshan (CN)

( * ) Notice: Subject to any disclaimer, the term of this patent is extended or adjusted under 35 U.S.C. 154(b) by 423 days.

(21) Appl. No.: 13/522,953

(22) PCT Filed: Oct. 29, 2010

(86) PCT No.: PCT/CN2010/001722
§ 371 (c)(1),
(2), (4) Date: Jul. 18, 2012

(87) PCT Pub. No.: WO2011/050584
PCT Pub. Date: May 5, 2011

(65) Prior Publication Data
US 2013/0008001 A1   Jan. 10, 2013

(30) Foreign Application Priority Data
Nov. 2, 2009   (CN) .......................... 2009 1 0193740

(51) Int. Cl.
| | |
|---|---|
| *B21D 28/28* | (2006.01) |
| *B23P 19/00* | (2006.01) |
| *B23P 19/12* | (2006.01) |
| *B21D 53/02* | (2006.01) |
| *B21D 53/06* | (2006.01) |
| *F28F 9/02* | (2006.01) |

(52) U.S. Cl.
CPC ............... *B21D 28/28* (2013.01); *B23P 19/004* (2013.01); *B23P 19/12* (2013.01); *B21D 53/02* (2013.01); *B21D 53/06* (2013.01); *F28F 9/0212* (2013.01)
USPC ........... 29/33 T; 29/564.7; 29/56.6; 72/353.2; 72/394

(58) Field of Classification Search
CPC .......... B21D 28/28; B21D 53/02; B21D 53/06
USPC ...... 29/33 D, 33 T, 56.6, 564.1, 564.2, 564.7; 72/296, 317, 353.2, 354.2, 370.04, 72/370.11, 394, 398, 403; 83/54
See application file for complete search history.

(56) References Cited

U.S. PATENT DOCUMENTS 1,983,584 A * 12/1934 Urschel ........................... 72/302
(Continued)

FOREIGN PATENT DOCUMENTS

CN         101480676 A  *  7/2009

*Primary Examiner* — Erica E Cadugan
*Assistant Examiner* — Michael Vitale
(74) *Attorney, Agent, or Firm* — Matthias Scholl P.C.; Matthias Scholl

(57) ABSTRACT

An automatic processing machine for header includes a frame (1), a pipe clamp (21), a punch assembly (22) and a translation mechanism (23) which can drive the pipe clamp (21) and the punch assembly (22) to slide. The pipe clamp (21), the punch assembly (22), and the translation mechanism (23) are all positioned on the working table (101) of the frame (1). The translation mechanism (23) includes a first slide seat (231) sliding along X axis. One of the pipe clamp (21) and the punch assembly (22) is positioned on the first slide seat (231) and the other is positioned on the frame (1). A separator transferring device (3) is also positioned on the working table (101) for transferring the separator into the pipe. The separator transferring device (3) and the pipe clamp (21) are separately positioned on either side of the punch assembly (22). The automatic processing machine for header combines a hole punching device with a separator transferring device, thereby improving the processing efficiency.

9 Claims, 10 Drawing Sheets

(56) References Cited

U.S. PATENT DOCUMENTS

| | | | |
|---|---|---|---|
| 3,866,457 A * | 2/1975 | Bagby | 72/370.03 |
| 4,106,322 A * | 8/1978 | Moshnin et al. | 72/356 |
| 6,289,710 B1 * | 9/2001 | Ozeki | 72/370.04 |
| 7,168,284 B2 * | 1/2007 | Shiokawa | 72/370.06 |

* cited by examiner

AUTOMATIC PROCESSING MACHINE FOR HEADER

CROSS-REFERENCE TO RELATED APPLICATIONS

This application is a National Stage Appl. filed under 35 USC 371 of International Patent Application No. PCT/CN2010/001722 with an international filing date of Oct. 29, 2010, designating the United States, and further claims priority benefits to Chinese Patent Application No. 200910193740.0 filed Nov. 2, 2009.

CORRESPONDENCE ADDRESS

Inquiries from the public to applicants or assignees concerning this document should be directed to: MATTHIAS SCHOLL P.C., ATTN.: DR. MATTHIAS SCHOLL ESQ., 14781 MEMORIAL DRIVE, SUITE 1319, HOUSTON, Tex. 77079.

BACKGROUND OF THE INVENTION

1. Field of the Invention

The invention relates to an automatic processing machine for a collecting pipe.

2. Description of the Related Art

Conventional processing equipment for collecting pipes on the market has a low automation and mainly includes a flat hole punching machine, a spacer inserting machine, and a flat tube straightening and cutting machine. To ensure the zig-zag flow of medium in a collecting pipe, a spacer is required to be installed in the collecting pipe. In the production of the conventional collecting pipe, long flat holes are manually punched first, all flat holes on a pipe are punched at one time through a special die provided with a plurality of punching knives, then a spacer hole is sawed on the punched pipe, a spacer is inserted, and finally, the spacer hole is repair-welded. Thus, the processing is complex, artificial feeding or blanking is required in the whole processing process, the process is cumbersome, the operational difficulty is increased, and the production efficiency is low. Therefore, the processing equipment and the processing technology for the conventional collecting pipe are required to be improved, and a device and a method for integrating the flat hole punching technology and spacer inserting technology for the collecting pipe together are desired.

SUMMARY OF THE INVENTION

In view of the above-described problems, the invention provides an automatic processing machine for a collecting pipe that integrates the flat hole punching technology and spacer inserting technology and has a high automation. By the processing machine, the digital control of spacer inserting is achieved, and the working efficiency of collecting pipe processing is effectively improved.

To achieve the above objective, the following technical scheme is adopted.

An automatic processing machine for a collecting pipe comprises a machine frame, a pipe clamp and a punch assembly which are installed on a working table of the machine frame, and a translation mechanism for driving the pipe clamp and punch assembly to make relative translational motion, wherein the translation mechanism comprises a first slide seat capable of sliding left and right along the X axis and a servo drive device for driving the first slide seat to slide; one of the pipe clamp and the punch assembly is arranged on the first slide seat, and the other of the pipe clamp and the punch assembly is arranged on the machine frame; the working table further comprises a spacer transfer device used for transferring a spacer into a machined pipe, and the spacer transfer device and pipe clamp are positioned on two sides of the punch assembly, respectively.

The spacer transfer device comprises a spacer channel, a core rod capable of axially moving along the X axis, and a first driving device for driving the core rod to move along the X axis; a through groove for allowing a spacer to enter in is formed on an inner wall of the spacer channel; the front end of the core rod can be inserted from one end of the spacer channel, and the spacer in the spacer channel can be pushed into a pipe inserted from the other end.

A second slide seat capable of sliding along the X axis is installed on the working table; the second slide seat and first slide seat are positioned on two sides of the working table, respectively; the pipe clamp is fixed on the first slide seat, and the core rod is pivotally installed on the second slide seat; the first driving device drives the core rod to make translational motion along the X axis through the second slide seat, and a driving lead screw is arranged between the first driving device and second slide seat.

A female die capable of extending in a pipe to cooperate with the punch assembly for punching a flanged edge on the pipe along the radial direction of the pipe is arranged at the front part of the core rod; a notch is formed on the female die; a gap used for allowing the female die to retreat from the pipe after punching is also arranged at the front part of the female die; the notch and the gap are positioned on two opposite sides of the female die, respectively; one side of the gap extends to the front end surface of the female die, and an intermittent driving device for driving the core rod to rotate around its axis is arranged on the second slide seat.

The spacer transfer device comprises a left template, a right template, and two air cylinders for driving the left template and right template to be stretched or clamped; a left semicircular groove and a right semicircular groove are formed on the left template and the right template, respectively, and the left semicircular groove and the right semicircular groove are encircled to form the spacer channel; a left strip-shaped groove and a right strip-shaped groove are symmetrically formed on two opposite surfaces of the left template and the right template, respectively, and the two are encircled to form the through groove.

A left annular groove and a right annular groove are symmetrically formed on the inner walls of the left semicircular groove and the right semicircular groove, respectively; one end of the left strip-shaped groove is communicated with the left annular groove, and the other end of the left strip-shaped groove extends to the upper end surface of the left template; one end of the right strip-shaped groove is communicated with the right annular groove, and the other end of the right strip-shaped groove extends to the upper end surface of the right template; and a smooth cambered surface convenient for a spacer to slide out is arranged on the groove walls of the left annular groove and the right annular groove which are adjacent to a clamp.

A blanking channel communicated with the through groove is arranged on the spacer transfer device, and a channel switch used for controlling the spacer to slide into the through groove is arranged at an outlet of the blanking channel.

The channel switch comprises a lower stop lever and an upper stop lever, which are positioned on the front side and rear side of the blanking channel, respectively; through holes for allowing the lower stop lever and the upper stop lever to penetrate through are correspondingly formed on the blanking channel, and the spacer transfer device further comprises an air cylinder for driving the lower stop lever and the upper stop lever to move backwards and forwards for realizing the opening or closing of the blanking channel.

The servo drive device is a linear motor.

The punch assembly comprises a sliding block capable of move up and down along the Y axis, and a second servo motor for driving the sliding block to move; a punching knife is installed on the sliding block, and a crank connecting rod transmission mechanism is arranged between an output end of the second servo motor and the sliding block.

Advantages of the invention are summarized below:

1. The pipe is fixed on the clamp on the first slide seat, and the linear motor drives the first slide seat to slide left and right along the X axis for positioning the punching position of a cutting knife on the punch assembly relative to a machined pipe, so that the accurate positioning of the punching position of the pipe is realized through circular punching; the automatic processing of the pipe diameter, wall thickness, and hole pitch of collecting pipes with different specifications can be realized, the automation is high, the trouble of newly replacing the die and tool during the process of replacing the kind of collecting pipes with different specifications each time in the prior art is avoided, and the operation is also convenient;

2. A plurality of pipe clamps can also be arranged on the first slide seat in parallel, and thus a plurality of pipes can be fixed on the pipe clamps on the first slide seat; the linear motor drives the first slide seat to slide left and right along the X axis for positioning the punching position of each cutting knife on the punch assembly relative to each machined pipe, so that the purposes of punching the pipes at the same time and accurately positioning the punching position are achieved through circular punching, and the processing efficiency is high;

3. The core rod is installed on the second slide seat and driven by the servo motor to rotate, the second slide seat is driven by the first driving device (servo motor) to slide left and right along the X axis; the core rod is matched with the punch assembly for punching the pipe during the punching process; the spacer in the spacer channel is pushed into the pipe after punching through the core rod, so that the flat hole punching technology and spacer inserting technology are integrated; the control of spacer inserting is digitized, the working efficiency of collecting pipe processing is effectively improved, and the automation is high; and 4. As for the flat hole punching machine and the spacer inserting machine, the core rod is not required to be manually assembled and disassembled, the spacer hole is not required to be sawed, the working efficiency is greatly improved, and thus more labor cost is saved by clients under high automation. The new collecting pipe processing technology is more scientific and more reasonable, and saves more resources and improves the efficiency even more. It has huge market potential, and more economic benefits can be brought to all collecting pipe manufacturers.

BRIEF DESCRIPTION OF THE DRAWINGS

The following drawings aim to serve as the further description for an automatic processing machine for a collecting pipe.

DETAILED DESCRIPTION OF THE EMBODIMENTS

Figure 1:
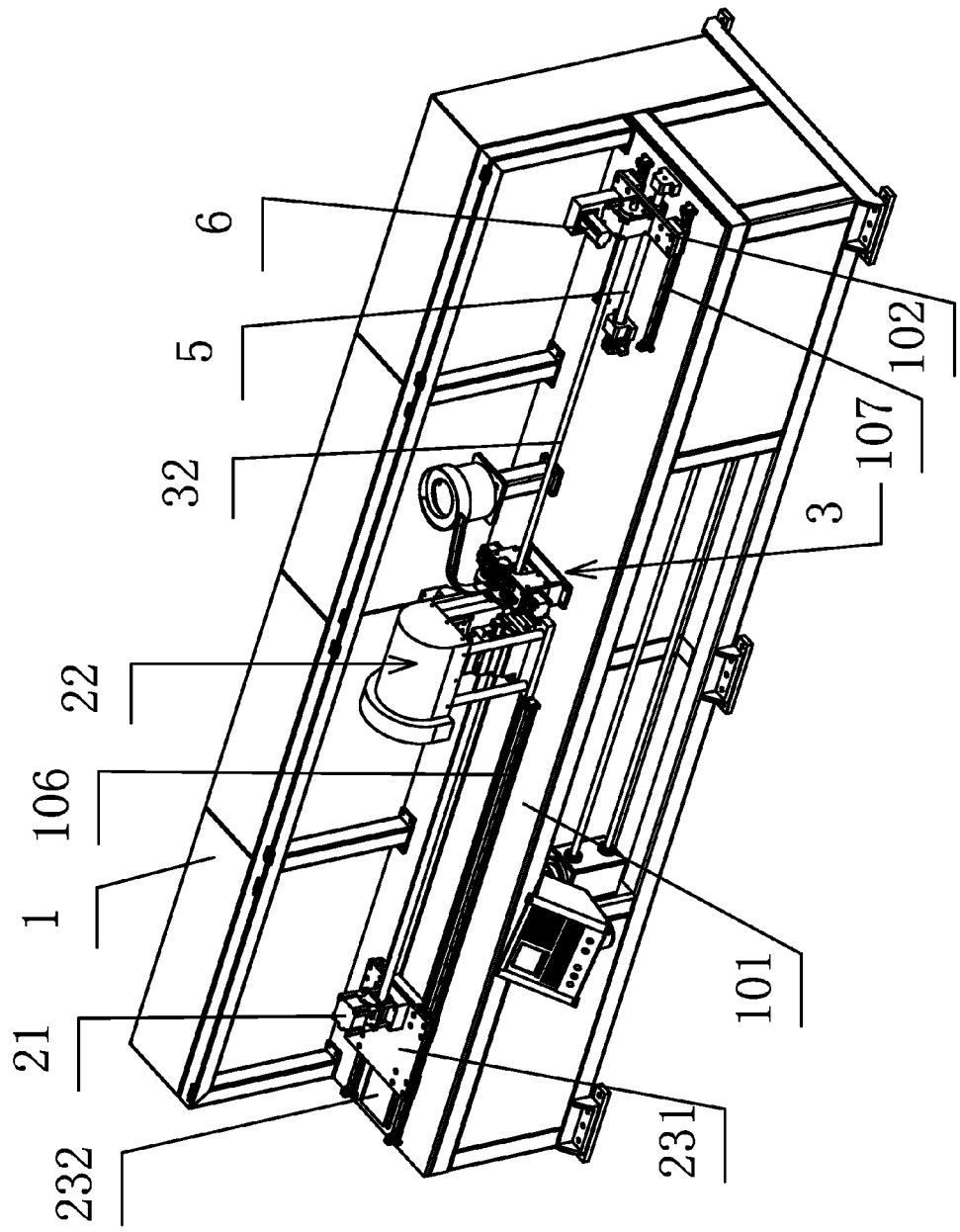
FIG. 1 is a three-dimensional structure diagram of an automatic processing machine for a collecting pipe.
Figure 2:
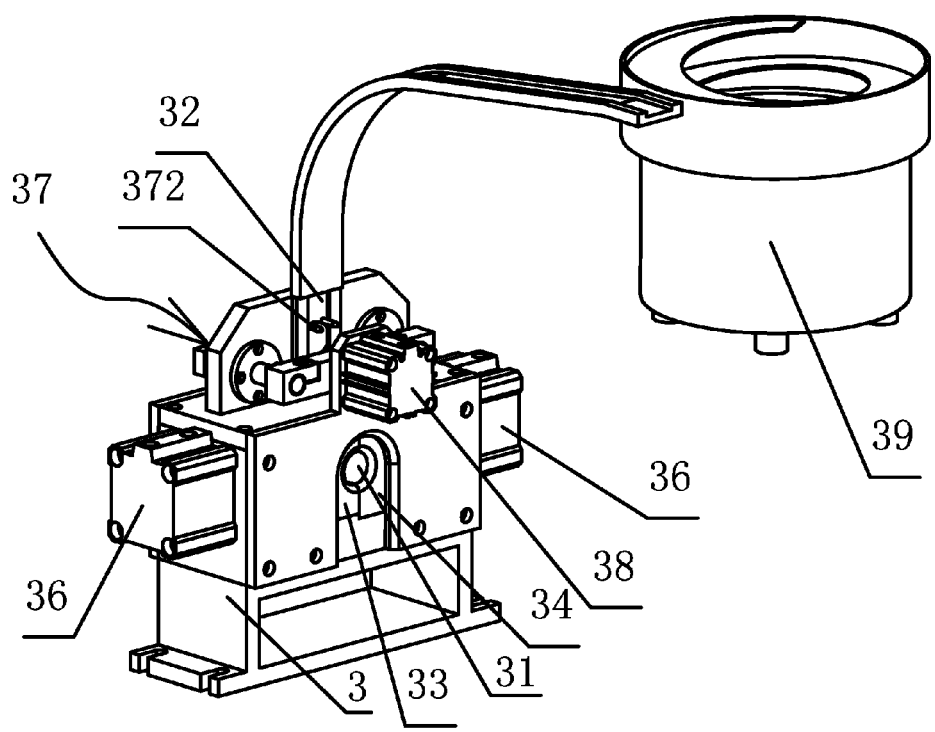
FIG. 2 is a structure diagram of a spacer transfer device.
Figure 3:
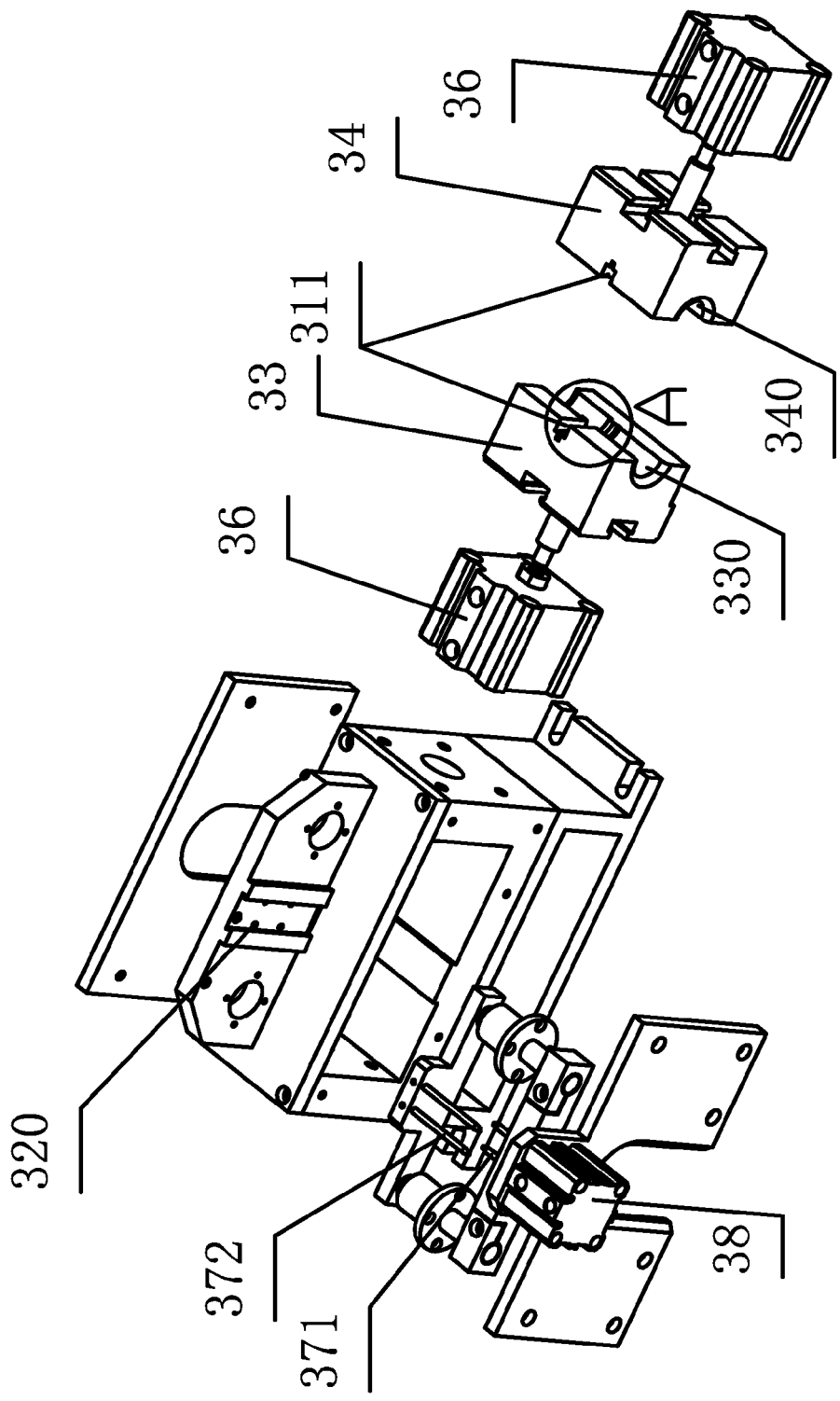
FIG. 3 is an exploded view of a spacer transfer device.
Figure 4:
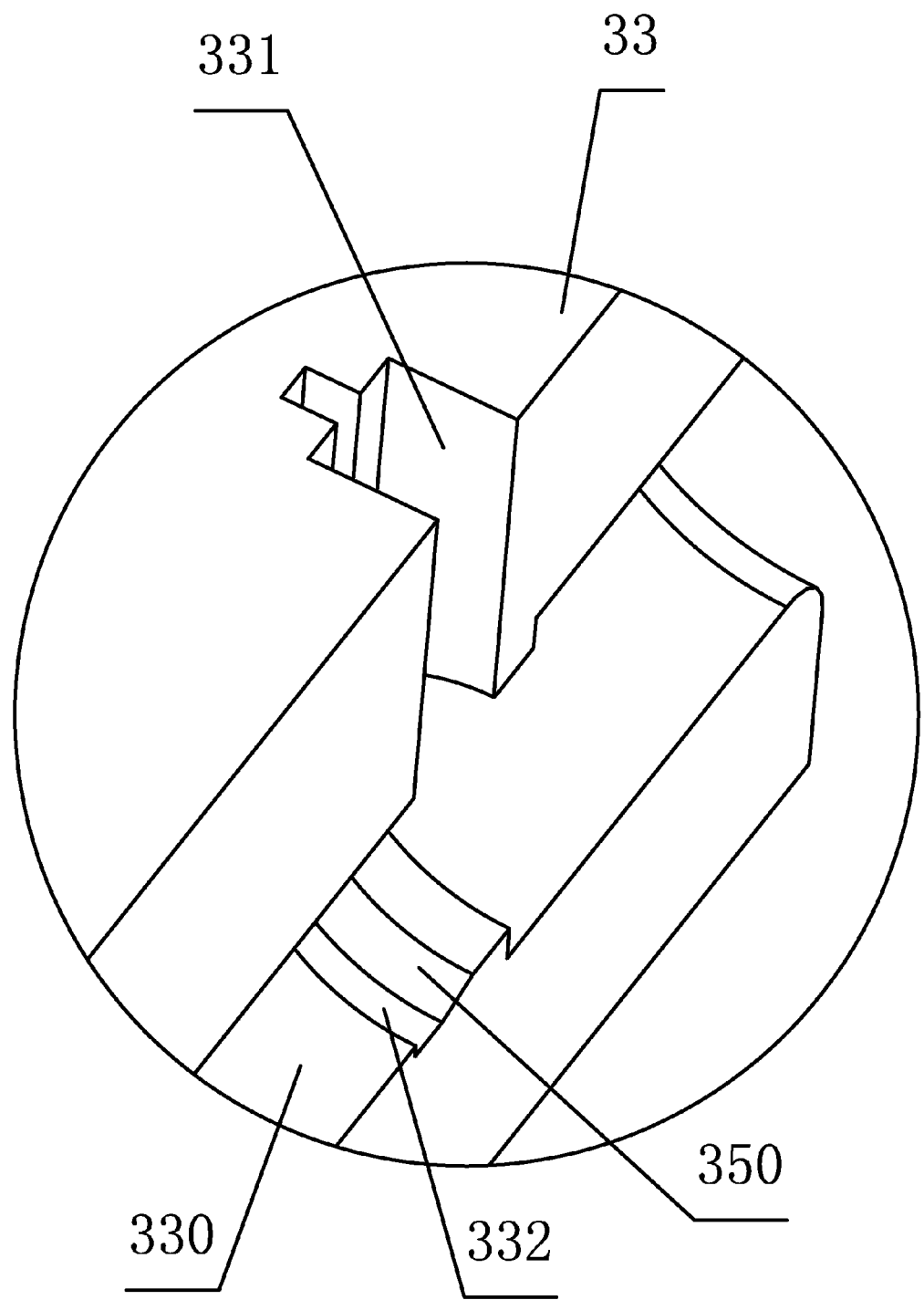
FIG. 4 is an enlarged view at the A point in FIG. 3.
Figure 5:
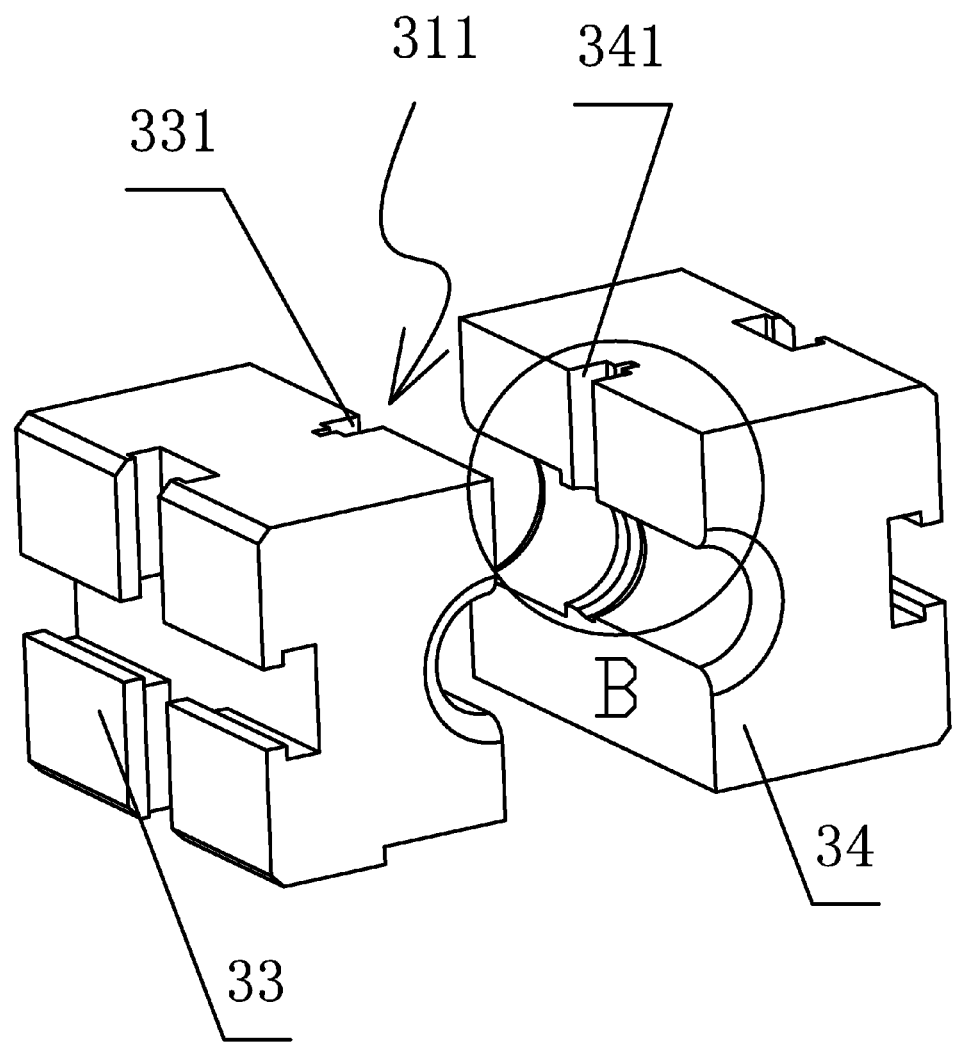
FIG. 5 are three-dimensional structure diagrams of a left template and a right template.
Figure 6:
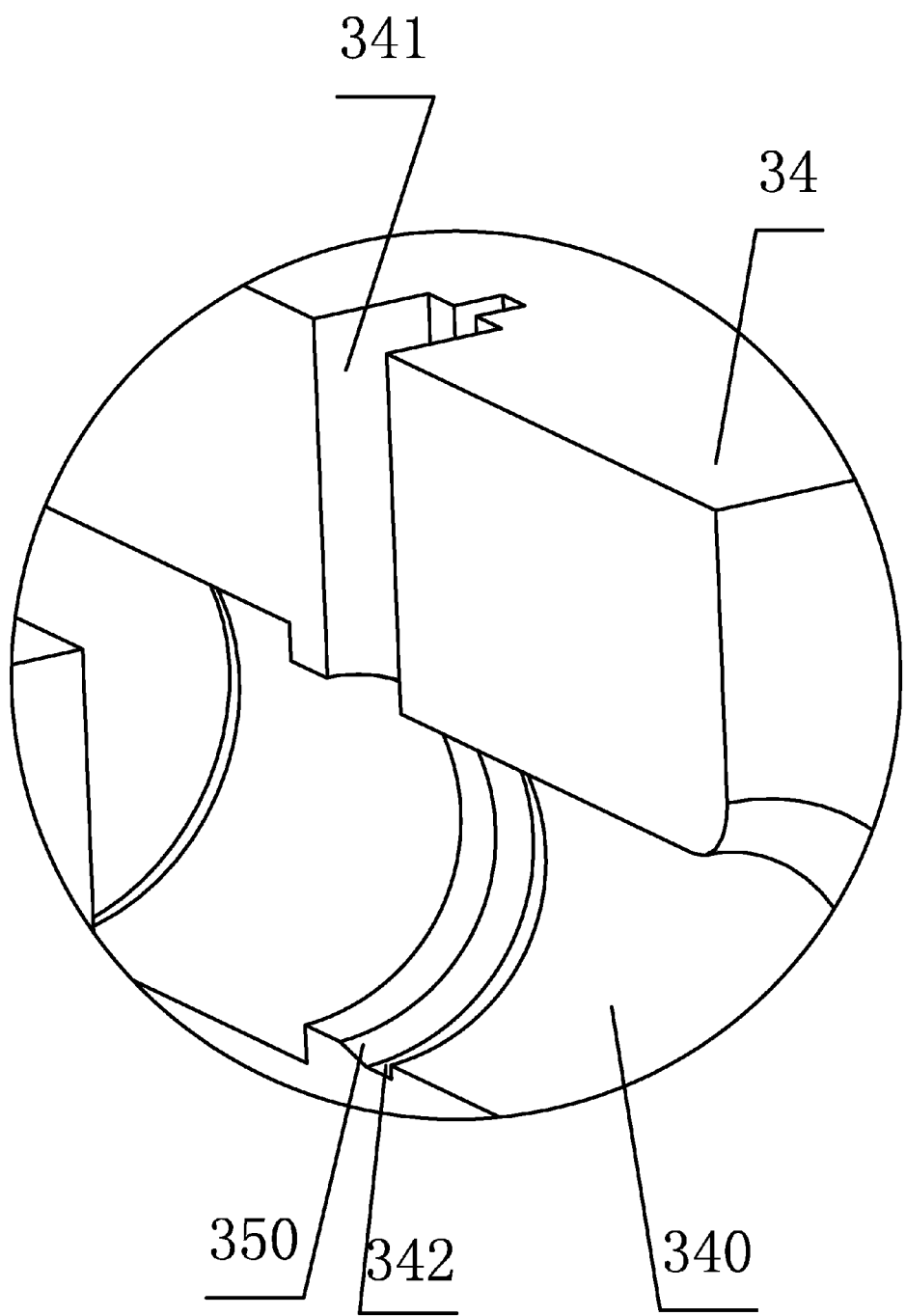
FIG. 6 is an enlarged view at the B point in FIG. 5.
Figure 7:
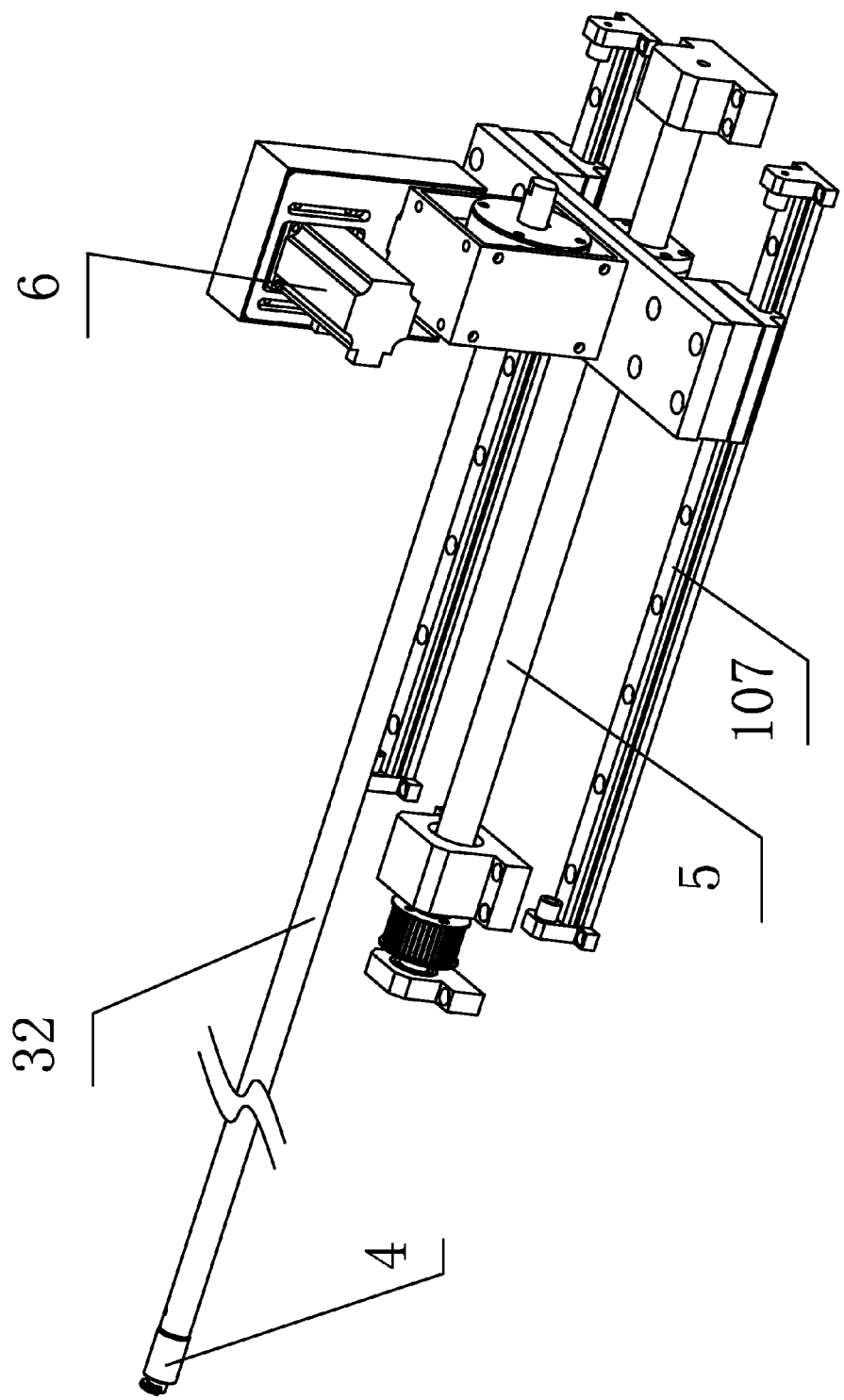
FIG. 7 are structure diagrams of a second slide seat and a core rod on a second slide seat.
Figure 8:
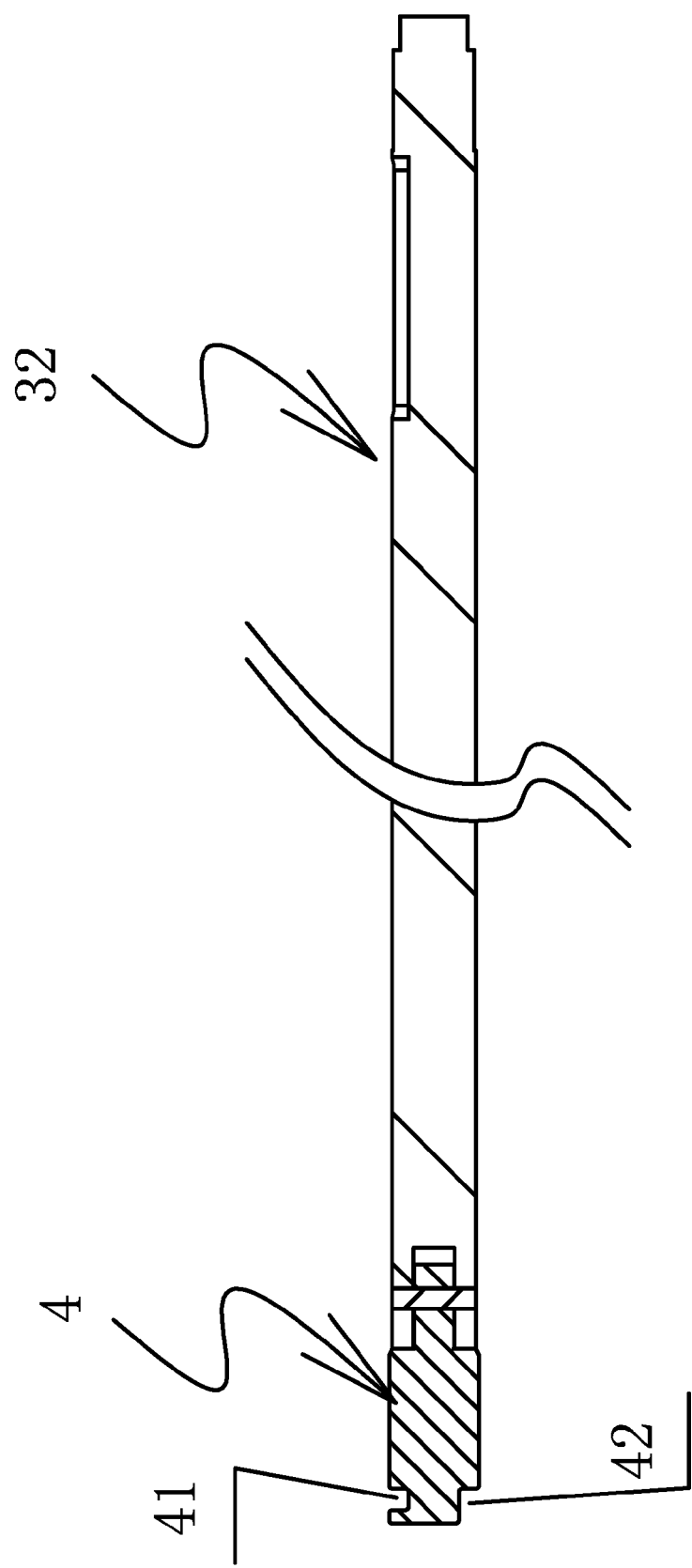
FIG. 8 is a main section view of a core rod.
Figure 9:
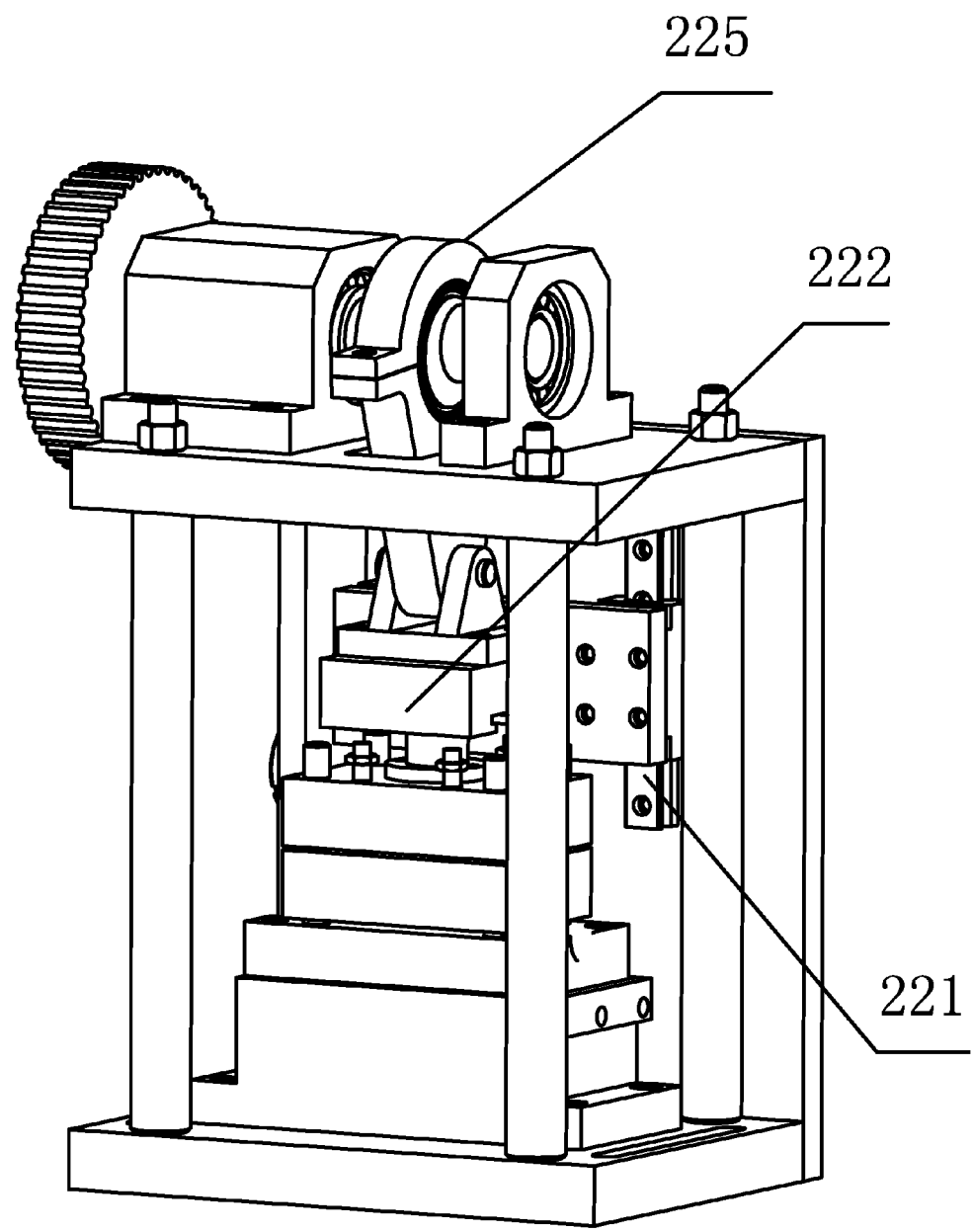
FIG. 9 is a first structure diagram of a punch assembly.
Figure 10:
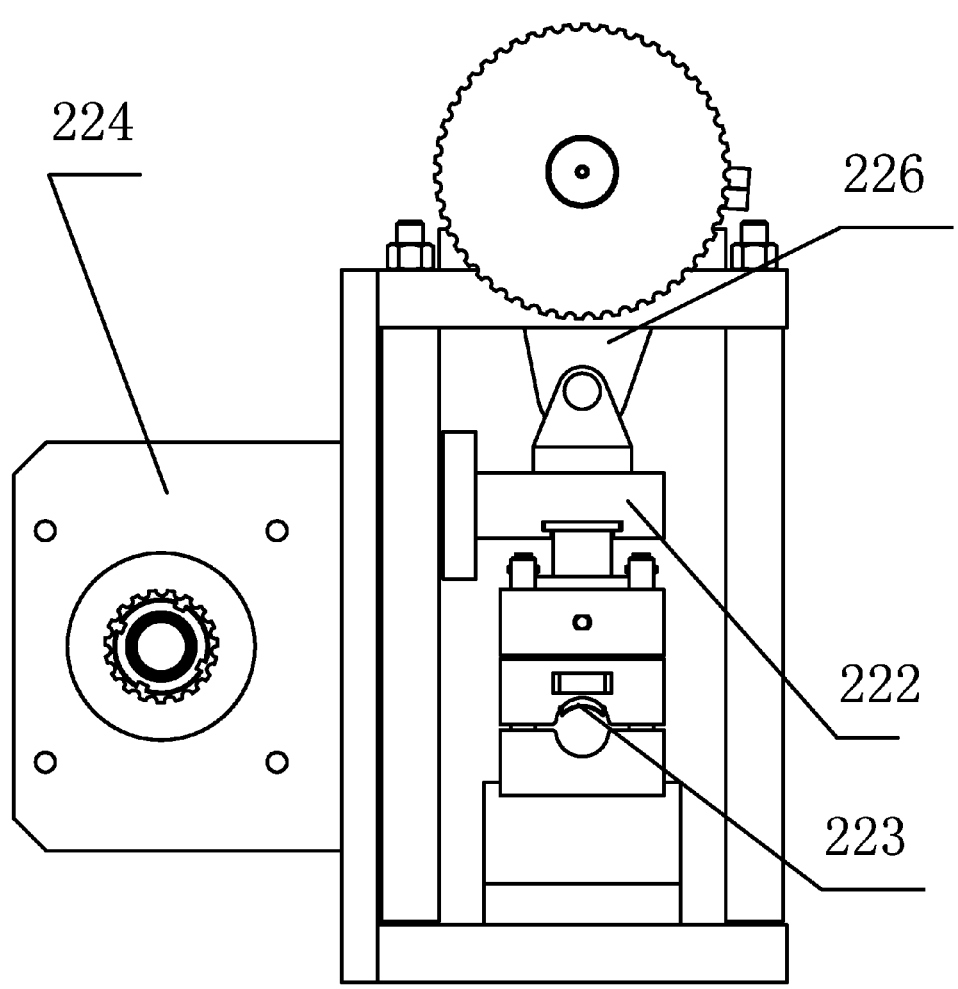
FIG. 10 is a second structure diagram of a punch assembly.

As shown in figures, an automatic processing machine for a collecting pipe comprises a machine frame 1, and a pipe clamp 21 and a punch assembly 22 which are installed on a working table 101 of the machine frame 1. A translation mechanism 23 is also arranged on the working table 101 and comprises a first slide seat 231 capable of sliding left and right along the X axis and a servo drive device 232 for driving the first slide seat 231 to slide. One of the pipe clamp 21 and the punch assembly 22 is arranged on the first slide seat 231, and the other is arranged on the machine frame 1. A spacer transfer device 3 used for transferring a spacer into a machined pipe is arranged on the working table 101. The spacer transfer device 3 and the pipe clamp 21 are positioned on two sides of the punch assembly 22, respectively.

The spacer transfer device 3 comprises a spacer channel 31, a core rod 32 capable of axially moving along the X axis, and a first driving device for driving the core rod 32 to move along the X axis. The first driving device is a servo motor. A through groove 311 for allowing a spacer to enter in is formed on the inner wall of the spacer channel 31. The front end of the core rod 32 can be inserted from one end of the spacer channel 31, and the spacer in the spacer channel 31 can be pushed into a pipe inserted from the other end.

A second slide seat 102 capable of sliding along the X axis is installed on the working table 101. The second slide seat 102 and first slide seat 231 are positioned on two sides of the working table 101, respectively. A first horizontal slide rail 106 and a second horizontal slide rail 107 are arranged on two sides of the working table 101, respectively. The first slide seat 231 and the second slide seat 102 are installed on the first horizontal slide rail 106 and the second horizontal slide rail 107, respectively. The pipe clamp 21 is fixed on the first slide seat 231. The core rod 32 is pivotally installed on the second slide seat 102. The first driving device drives the core rod 32 to make translational motion along the X axis through the second slide seat 102, and a driving lead screw 5 is arranged between the first driving device and second slide seat 102.

A female die 4 capable of extending in a pipe to be matched with the punch assembly 22 for punching a flanged edge on the pipe along the radial direction of the pipe is arranged at the front part of the core rod 32. A notch 41 is formed on the female die 4, and a gap 42 used for allowing the female die 4 to retreat from the pipe after punching is also arranged at the front part of the female die 4. The gap 42 and the notch 41 are positioned on two opposite sides of the female die 4, respectively. One side of the gap 42 extends to the front end surface of the female die 4, and an intermittent driving device 6 for driving the core rod 32 to rotate around its axis is also arranged on the second slide seat 102 and adopts a servo motor.

In the invention, the spacer transfer device 3 comprises a left template 33, a right template 34, and two air cylinders 36 for driving the left template 33 and right template 34 to be stretched or clamped. A left semicircular groove 330 and a right semicircular groove 340 are formed on the left template 33 and the right template 34, respectively, and encircled into the spacer channel 31. A left strip-shaped groove 331 and a right strip-shaped groove 341 are symmetrically formed on two opposite surfaces of the left template 33 and the right template 34 respectively, and encircled into the through groove 311.

A left annular groove 332 and a right annular groove 342 are symmetrically formed on the inner walls of the left semicircular groove 330 and the right semicircular groove 340. One end of the left strip-shaped groove 331 is communicated with the left annular groove 332, and the other end of the left strip-shaped groove 331 extends to the upper end surface of the left template 33. One end of the right strip-shaped groove 341 is communicated with the right annular groove 342, and the other end of the right strip-shaped groove 341 extends to the upper end surface of the right template 34. A smooth cambered surface 350 convenient for a spacer to slide out is arranged on the groove walls of the left annular groove 332 and the right annular groove 342 which are adjacent to a clamp 102.

A blanking channel 32 communicated with the through groove 311 is also arranged on the spacer transfer device 3, and a channel switch 37 used for controlling the spacer to slide into the through groove 311 is arranged at an outlet of the blanking channel 32. The channel switch 37 comprises a lower stop lever 371 and an upper stop lever 372, which are positioned on the front side and rear side of the blanking channel 32 respectively. Through holes 320 for allowing the lower stop lever 371 and the upper stop lever 372 to penetrate through are correspondingly formed on the blanking channel 32, and the spacer transfer device 3 further comprises an air cylinder 38 for driving the lower stop lever 371 and the upper stop lever 372 to move backwards and forwards for realizing the opening or closing of the blanking channel 32.

The punch assembly 22 comprises a slide rail 221 arranged along the Y axis. A sliding block 222 capable of sliding along the slide rail 221 and a second servo motor 224 for driving the sliding block 222 to move are movably clamped on the slide rail 221 respectively. A punching knife 223 is installed on the sliding block 222, and a crank connecting rod transmission mechanism is arranged between the output end of the second servo motor 224 and the sliding block 222. In the automatic processing machine for a collecting pipe, the crank connecting rod transmission mechanism comprises an eccentric wheel 225 and a connecting rod 226. The eccentric wheel 225 is connected with the second servo motor 224 through a belt, and two ends of the connecting rod 226 are rotatably connected with the sliding block 222 and the eccentric wheel 225.

The working process of the automatic processing machine for a collecting pipe is as follows:

The first step is to load material: At the initial position of the first slide seat, the pipe is fixed on the pipe clamp 21. Then the linear motor 232 drives the pipe clamp 21 right to the specified position, and the servo motor drives the core rod 32 to penetrate the spacer channel 31 on the spacer transfer device 3 and be inserted into the pipe through the driving lead screw 5 and the second slide seat 102.

The second step is to punch: The second servo motor 224 is started to enable the sliding block 222 to move downwards from an upper dead point. The movement trace of the sliding block 222 includes three positions of an upper dead point, an intermediate position, and a lower dead point, and the sliding block 222 moves downwards to pass through the lower dead point and then moves upwards to return to the upper dead point to form a cycle. During the punching process, the intermittent driving device 6 drives the core rod 32 to rotate, the notch 41 on the female die 4 at the front end of the core rod 32 is just opposite to the punching knife 223, the sliding block 222 moves downwards from the upper dead point to reach the lower dead point, that is, punching is finished with ½ cycle. Thus, two flanged edges are formed in the pipe, and leans against two opposite sides of the notch 41. In the process of the sliding block 222 to move upwards from the lower dead point to reach the intermediate position, i.e., in the process of the sliding block 222 to run to ¾ cycle from ½ cycle, the intermittent driving device 6 drives the core rod 32 to rotate for 180 degrees, and at the moment, the gap 42 on the female die 4 is just opposite to the side where the flanged edge on the pipe is, so as to make preparation for the core rod to retreat from the pipe. In the process of the sliding block 222 to move to the upper dead point from the intermediate position, i.e., in the process of the sliding block 222 to run to 4/4 cycle from ¾ cycle, the linear motor 232 drives the pipe to move left for a distance, meanwhile, the intermittent driving device 6 drives the core rod 32 to rotate for 180 degrees, and the linear motor 232 drives the pipe clamp 21 to move to the next specified position along the X axis, so as to make preparation for next punching. Such a punching is repeated.

The third step is to retreat from the core rod: When the preset hole number is reached in the punching process of the punch assembly 22, the second servo motor 224 drives the sliding block 222 to move to stop at the upper dead point, meanwhile, the driving device 6 drives the core rod 32 to rotate for 180 degrees, and at the moment, the gap 42 on the female die 4 at the front end of the core rod 32 is just opposite to the side where the flanged edge on the pipe is, and the first driving device drives the core rod to retreat from the pipe through the driving lead screw 5.

The fourth step is to insert spacer: The left template 33 and the right template 34 are driven by the two air cylinders 36 to stretch, the air cylinder 38 controls the turning-on of the channel switch 57, and a spacer falls into the spacer channel 31. The linear motor drives the pipe to extend in the spacer channel 31 and be inserted to the set depth. The first driving device 33 drives the second slide seat 102 through the driving lead screw 5 to insert the core rod 32 on the second slide seat 102 to the set depth from the other end of the spacer channel 31; in this process, the spacer in the spacer channel 31 is pushed by the core rod 32 to horizontally slide into the pipe to be propped against the flanged edge in the pipe, then the left template 33 and the right template 34 are driven by the two air cylinders for sequentially clamping and loosening the pipe. The spacer is clamped on the inner wall of the pipe, and the linear motor 232 drives the pipe to move to the specified position for punching. Meanwhile, the first driving device drives the core rod 32 to synchronously move to the specified position for circular punching through the driving lead screw 5, and when the preset hole number is reached in the punching process of the punch assembly 22, the spacer is inserted again.

The fifth step is to collect workpieces: When the required hole quantity is reached in the punching process, the second servo motor 224 drives the sliding block 222 to move to stop at the upper dead point, and the first driving device drives the core rod 32 to rotate for 180 degrees through the driving lead screw 5, so that the gap 42 on the female die 4 at the front end of the core rod 32 is just opposite to the side where the flanged edge on the pipe is, the first driving device drives the core rod 32 to retreat from the pipe and return to the initial position, and meanwhile, the linear motor 232 moves left and returns to the initial position. When all is finished, the pipe clamp 21 is loosened, the processed material is taken out manually, and the processing of workpieces is finished.

The invention claimed is:

1. An automatic processing machine for making a pipe into a collecting pipe, the automatic processing machine comprising:
   a machine frame comprising a working table;
   a pipe clamp;
   a punch assembly;
   a translation mechanism comprising a first slide seat and a servo drive device; and
   a spacer transfer device; wherein:
   the punch assembly, the translation mechanism, and the spacer transfer device are disposed on the working table;
   the pipe clamp is disposed on the first slide seat;
   the punch assembly is fixed on the working table;
   the pipe clamp is adapted to clamp the pipe;
   the punch assembly is adapted to punch the pipe;
   the translation mechanism is adapted to drive the pipe clamp to perform a translational motion relative to the working table;
   the spacer transfer device is adapted to transfer a spacer into the pipe;
   the first slide seat is movable along a longitudinal axis of the pipe;
   the servo drive device is adapted to drive the first slide seat to slide along the longitudinal axis;
   the punch assembly is disposed between the spacer transfer device and the pipe clamp;
   the spacer transfer device comprises a spacer channel, a core rod movable along the longitudinal axis, and a first driving device for driving the core rod to move along the longitudinal axis;
   the spacer channel is adapted to receive the spacer;
   a through groove for allowing the spacer to enter in the spacer channel is formed on an outer wall of the spacer channel;
   the core rod comprises a first rod end and a second rod end, the first rod end is adapted to be inserted in the spacer channel, and the second rod end is adapted to be driven by the first driving device; and
   when in use, the first rod end is driven by the first driving device to be inserted in one end of the spacer channel and the pipe is driven by the servo drive device to be inserted in the other end of the spacer channel, and the spacer in the spacer channel is pushed into the pipe by the first rod end.

2. The automatic processing machine of claim 1, wherein:
   a second slide seat movable along the longitudinal axis is installed on the working table;
   the core rod is pivotally installed on the second slide seat;
   the first driving device is adapted to drive the second slide seat to move along the longitudinal axis such that the core rod performs a translational motion along the longitudinal axis; and
   a driving lead screw is arranged between the first driving device and second slide seat.

3. The automatic processing machine of claim 2, wherein:
   a female die is disposed at the first rod end;
   the female die is adapted to be inserted into the pipe to cooperate with the punch assembly for punching a flanged edge on the pipe along a radial direction of the pipe;
   the radial direction extends from the longitudinal axis to a point on a cylindrical outer surface of the pipe, and the radial direction is perpendicular to the longitudinal axis;
   a notch is formed on the female die;
   an indentation used for allowing the female die to retreat from the pipe after punching is also arranged at the female die;
   the female die comprises a first end surface, a second end surface, and a column having two opposite end portions;
   the first end surface is opposite to the second end surface;
   the second end surface is connected to the first rod end;
   the column extends from the first end surface to the second end surface;
   the notch and the indentation are positioned on the two opposite end portions, respectively;
   the indentation extends from the first end surface toward the second end surface; and
   an intermittent driving device for driving the core rod to rotate around its axis is arranged on the second slide seat.

4. The automatic processing machine of claim 1, wherein:
   the spacer transfer device comprises a left template, a right template, and two air cylinders for driving the left template and right template apart from and toward each other;
   a left semicircular groove and a right semicircular groove are formed on the left template and the right template, respectively;
   when in use, when the left template and the right template are driven together by the two air cylinders, the left semicircular groove and the right semicircular groove are driven together to form the spacer channel;
   a left strip-shaped groove and a right strip-shaped groove are symmetrically formed on two opposite surfaces of the left template and the right template, respectively; and
   when in use, when the left template and the right template are driven together by the two air cylinders, the left strip-shaped groove and the right strip-shaped groove are driven together to form the through groove.

5. The automatic processing machine of claim 4, wherein:
   a left annular groove and a right annular groove are symmetrically formed on an inner wall of the left semicircular groove and an inner wall of the right semicircular groove, respectively;
   one end of the left strip-shaped groove is communicated with the left annular groove, and the other end of the left strip-shaped groove extends to a first outer surface of the left template;
   one end of the right strip-shaped groove is communicated with the right annular groove, and the other end of the right strip-shaped groove extends to a second outer surface of the right template; and
   a smooth cambered surface convenient for a spacer to slide out is arranged on the groove walls of the left annular groove and the right annular groove which are adjacent to a clamp.

6. The automatic processing machine of claim 1, wherein a blanking channel communicated with the through groove is arranged on the spacer transfer device, and a channel switch used for controlling the spacer to slide into the through groove is arranged at an outlet of the blanking channel.

7. The automatic processing machine of claim 6, wherein:
   the channel switch comprises a lower stop lever and an upper stop lever, which are both positioned on the blanking channel;
   the lower stop lever is disposed below the upper stop lever in a vertical direction;
   through holes for allowing the lower stop lever and the upper stop lever to penetrate through are correspondingly formed on the blanking channel; and the spacer transfer device further comprises an air cylinder for driving the lower stop lever and the upper stop lever to move for realizing the opening or closing of the blanking channel.

8. The automatic processing machine of claim 1, wherein the servo drive device is a linear motor.

9. An automatic processing machine for making a pipe into a collecting pipe, the automatic processing machine comprising:
- a machine frame comprising a working table;
- a pipe clamp;
- a punch assembly;
- a translation mechanism comprising a first slide seat and a servo drive device; and
- a spacer transfer device; wherein:
- the punch assembly, the translation mechanism, and the spacer transfer device are disposed on the working table;
- the pipe clamp is disposed on the first slide seat;
- the punch assembly is fixed on the working table;
- the pipe clamp is adapted to clamp the pipe;
- the punch assembly is adapted to punch the pipe;
- the translation mechanism is adapted to drive the pipe clamp to perform a translational motion relative to the working table;
- the spacer transfer device is adapted to transfer a spacer into the pipe;
- the first slide seat is movable along a longitudinal axis of the pipe;
- the servo drive device is adapted to drive the first slide seat to slide along the longitudinal axis;
- the punch assembly is disposed between the spacer transfer device and the pipe clamp;
- the punch assembly comprises a sliding block movable along a vertical axis that is perpendicular to the longitudinal axis, and a second servo motor for driving the sliding block to move;
- a punching knife is installed on the sliding block; and
- a crank connecting rod transmission mechanism is arranged between an output end of the second servo motor and the sliding block.

\* \* \* \* \*